(12) United States Patent
Baxter (10) Patent No.: US 10,816,339 B2
(45) Date of Patent: Oct. 27, 2020

(54) ANGULAR RATE SENSORS INCLUDING ONE OR MORE SUPPORTING STRUCTURES HAVING PORTIONS WITH DIFFERENT THICKNESSES

(71) Applicant: Atlantic Inertial Systems Limited, Plymouth, Devon (GB)

(72) Inventor: Jason Baxter, Plymouth (GB)

(73) Assignee: ATLANTIC INERTIAL SYSTEMS, LIMITED, Plymouth, Devon (GB)

( * ) Notice: Subject to any disclaimer, the term of this patent is extended or adjusted under 35 U.S.C. 154(b) by 183 days.

(21) Appl. No.: 16/029,711

(22) Filed: Jul. 9, 2018

(65) Prior Publication Data
US 2019/0041212 A1   Feb. 7, 2019

(30) Foreign Application Priority Data

Aug. 7, 2017 (GB) .................................. 1712670.7

(51) Int. Cl.
*G01C 19/5677* (2012.01)
*G01C 19/5684* (2012.01)
*G01C 19/5783* (2012.01)

(52) U.S. Cl.
CPC ..... *G01C 19/5677* (2013.01); *G01C 19/5684* (2013.01); *G01C 19/5783* (2013.01)

(58) Field of Classification Search
CPC ............ G01C 19/5776; G01C 19/5726; G01C 19/5755; G01C 25/00; G01C 25/005; G01C 19/56; G01C 19/5691
See application file for complete search history.

(56) References Cited

U.S. PATENT DOCUMENTS

| | | | |
|---|---|---|---|
| 5,739,410 | A | 4/1998 | Fell |
| 5,915,276 | A | 6/1999 | Fell |
| 6,282,958 | B1 | 9/2001 | Fell |
| 6,471,883 | B1 | 10/2002 | Fell et al. |
| 6,550,329 | B1 | 4/2003 | Watson |
| 6,848,305 | B2 | 2/2005 | Fell et al. |
| 6,883,374 | B2 | 4/2005 | Fell et al. |
| 6,978,674 | B2 | 12/2005 | Fell et al. |
| 7,481,112 | B2 | 1/2009 | Kim et al. |

(Continued)

FOREIGN PATENT DOCUMENTS

| | | |
|---|---|---|
| EP | 2799814 A1 | 11/2014 |
| WO | 2010007406 A2 | 1/2010 |

OTHER PUBLICATIONS

European Search Report for Application No. 18187856.20-1003, dated Jan. 10, 2019.

(Continued)

*Primary Examiner* — Brandi N Hopkins
(74) *Attorney, Agent, or Firm* — Cantor Colburn LLP (57) ABSTRACT

An annular resonator for a vibrating structure angular rate sensor comprises a planar annular member that lies in the X-Y plane and one or more supporting structures arranged to flexibly support the annular member in the X-Y plane. The one or more supporting structures each comprise a radial portion, extending radially from the annular member and having a first thickness in the X-Y plane, and a circumferential portion, extending circumferentially from the radial portion and having a second thickness in the X-Y plane, wherein the first thickness is greater than the second thickness.

17 Claims, 5 Drawing Sheets

(56) References Cited

U.S. PATENT DOCUMENTS

| | | | |
|---|---|---|---|
| 8,756,994 B2* | 6/2014 | Yoneda | G01C 19/5755 73/504.12 |
| 2001/0013252 A1 | 8/2001 | Namerikawa et al. | |
| 2011/0167911 A1* | 7/2011 | Fell | G01C 19/5684 73/504.12 |
| 2014/0331769 A1* | 11/2014 | Fell | G01C 19/5684 73/504.12 |

OTHER PUBLICATIONS

International Property Office Search Report for International Application No. 1712670.7 dated Jan. 10, 2018, 3 pages.

* cited by examiner

ANGULAR RATE SENSORS INCLUDING ONE OR MORE SUPPORTING STRUCTURES HAVING PORTIONS WITH DIFFERENT THICKNESSES

This application claims priority to United Kingdom Patent Application No. 1712670.7 filed Aug. 7, 2017, the entire contents of which is incorporated herein by reference.

TECHNICAL FIELD

The present disclosure relates to angular rate sensors, in particular Coriolis-type angular rate sensors comprising a vibrating structure such as an annular resonator, and to annular resonators for vibrating structure angular rate sensors.

BACKGROUND

For many modern applications, Coriolis-type angular rate sensors (also known as gyroscopes) are constructed using Micro-Electro-Mechanical Systems (MEMS) techniques from a silicon wafer sandwiched between glass substrate layers. A planar annular resonator, typically comprising a ring structure, is formed in the silicon layer and supported on the lower glass substrate by compliant supporting structures. The annular resonator is driven into a cos 2θ mode of vibration at resonance by primary drive transducers that excite the primary vibration mode (in-plane). When the sensor undergoes rotation about an axis perpendicular to the plane of the annular resonator, Coriolis forces are generated which couple energy into the secondary vibration mode (in-plane). Such Coriolis-induced motion of the annular resonator is, typically, inductively or capacitively sensed using secondary pick-off transducers. The ring and its supporting structures are in the same plane, manufactured by etching of the silicon layer. By exploiting two degenerate resonance modes with identical frequencies, the annular resonator has higher rotation sensitivity compared to moving mass architectures that use a single resonance mode for a vibrator that can be displaced out of plane. U.S. Pat. No. 6,471,883 provides an example of such an angular rate sensor comprising a planar ring vibrating structure manufactured from silicon.

In a vibrating structure angular rate sensor, the compliant or flexible supporting structures (often known as "legs") are designed to isolate the ring's vibration from the rest of the structure. The thinner the support legs the more isolated the ring for sensing purposes i.e. a higher performance (a higher Q factor). However, a high performance structure may not survive under large shocks without thickening the legs. When the legs are thickened to make the sensor more robust, the overall sensor performance is degraded (the Q factor is decreased). The Q is principally set by the thermo elastic damping of the ring. The thicker legs tend to increase the quadrature bias rather than the Q factor. The higher quadrature tends to degrade performance. Another issue is unwanted natural resonant modes. For example, shock in shear can excite the translational mode. By thickening and stiffening the legs, movement in the translational mode is restricted but unwanted resonant modes can become very close in frequency to the cos 2θ mode, which can lead to undesirable dynamics.

There remains a need to design a robust vibrating structure angular rate sensor without compromising on performance.

SUMMARY

The present invention seeks to provide improvements in vibrating structure angular rate sensors.

The present disclosure provides an annular resonator for a vibrating structure angular rate sensor, the annular resonator comprising: a planar annular member that lies in the X-Y plane; and one or more supporting structures arranged to flexibly support the annular member in the X-Y plane. The one or more supporting structures each comprise a radial portion, extending radially from the annular member and having a first thickness in the X-Y plane, and a circumferential portion, extending circumferentially from the radial portion and having a second thickness in the X-Y plane, wherein the first thickness is greater than the second thickness.

Thus it will be seen by those skilled in the art that, in accordance with this disclosure, the supporting structures (i.e. legs) are split into at least two substantially orthogonal portions having different thicknesses in the X-Y plane. Furthermore, the radial portions are thicker than the circumferential portions. This lowers the peak leg stress, e.g. caused when shock in shear excites the translational mode, and increases the frequency of unwanted resonant modes without affecting the resonant frequency or the Q factor of the Cos 2θ mode used for sensing.

In some examples the supporting structures may be substantially L-shaped, with the radial portion extending radially from the annular member and the circumferential portion extending circumferentially from the radial portion. However it may be desirable for the supporting structures to extend further radially from the annular member e.g. to allow for electrical tracking to run out. Thus in some examples the one or more supporting structures each comprise a further radial portion which extends radially from the circumferential portion. The supporting structures may be substantially Z-shaped. In such examples, preferably the further radial portion extends radially in the same direction as the radial portion. The supporting structures may therefore be arranged as spokes around the annular member even with the circumferential portions. In addition, or alternatively, the supporting structures may extend radially inward or outward from the annular member. Preferably the supporting structures, arranged singularly or in sets e.g. pairs, are spaced equiangularly around the annular member.

The one or more supporting structures may be connected to a fixed support, located radially inward or outward of the annular member. In some examples the supporting structures are formed integrally with the fixed support. Additionally, or alternatively, the supporting structures are formed integrally with the annular member. The fixed support, annular member and supporting structures are preferably made of the same material, and further preferably they are constructed from a single silicon wafer using techniques known in the art e.g., using deep reactive ion etching (DRIE).

In any of these examples, electrically conductive (e.g. metallic) tracking may run along the one or more supporting structures, e.g. between the annular member and the fixed support. The angular rate sensor may be a capacitive type, an inductive type, or a piezoelectric type sensor. The inductive type normally has externally mounted support legs to allow for the central magnet, i.e. supporting structures extending radially outward from the annular member. The capacitive and piezoelectric type normally have inner mounted support legs, i.e. supporting structures extending radially inward from the annular member.

In a set of examples, the annular resonator may comprise an even number of supporting structures, preferably eight, arranged in pairs around the circumference of the annular member. The pairs of supporting structures may be spaced equiangularly around the circumference of the annular member in a manner e.g. as disclosed by WO 2010/007406, the contents of which are hereby incorporated by reference. Preferably each pair of supporting structures comprises a clockwise supporting structure and an anticlockwise supporting structure. In inductive type sensor examples comprising electrically conductive tracking running along the one or more supporting structures, a symmetric clockwise-anticlockwise pair of supporting structures prevents twisting of the annular resonator, due to current flowing along the tracking in the magnetic field. In other examples where the annular resonator comprises an odd number of supporting structures, the supporting structures may of course still be spaced equiangularly around the circumference of the annular member.

By selecting the first thickness to be greater than the second thickness, the modal spectrum can be optimised to give a higher frequency for the translational mode, which aids robustness without affecting the cos 2θ mode frequency. In one or more examples, the first thickness is at least 20%, 30%, 40% or 50% greater than the second thickness. In one or more examples, the first thickness is 20% to 80% greater than the second thickness. For example, the second thickness may be about 22 μm, and the first thickness may be at least 26 μm, e.g. 26-28 μm. In some examples, the second thickness may be in the range of 25-30 μm and the first thickness may be in the range of 35-40 μm. In some examples, the second thickness is as low as 10 μm. Thickening the radial portions (i.e. increasing the first thickness) increases some mode frequencies without affecting the cos 2θ mode frequency, and also reduces stress under shock. Thickening the circumferential portions (i.e. increasing the second thickness) increases the cos 2θ mode frequency and other mode frequencies while reducing the stress under shock. By tuning the difference between the first and second thicknesses, it is possible to decrease the stress under shock, making the sensor more robust, while maintaining a desired resonant frequency (e.g. 14 kHz) and high Q factor for the cos 2θ mode frequency and keeping unwanted modes suitably far away in frequency from the cos 2θ mode frequency.

In addition to adjusting the first and second thicknesses relative to one another, the thickness of the annular member may also be adjusted e.g. to adjust the resonant frequency of the cos 2θ mode.

In at least some examples, stress in the supporting structures may be reduced by adjusting the shape of the radial and/or circumferential portions. The Applicant has recognised that a maximum stress area may be experienced at a connection between a supporting structure and the annular member and/or, in examples comprising a fixed support, at a connection between a supporting structure and the fixed support. A maximum stress area may also be experienced at a connection between the radial and circumferential portions of a supporting structure. To alleviate the former, the radial portions of the supporting structures may be connected to the annular member and/or the fixed support by a connection, such as a fillet, wherein the supporting structure tapers from a higher width at the connection to a lower width away from the connection. To alleviate the latter, one or more connections between the radial portions and the circumferential portions, and optionally between the circumferential portions and the further radial portions, may comprise the supporting structure tapering from a higher width at the connection to a lower width away from the connection. In any of these examples, the connection may comprise an elliptical fillet. An elliptical fillet has been found to provide good stress reduction, although other shapes of fillet are possible, for example curved, triangular or flared. FE analysis may be used to optimise the varying width of the connection and reduce stress concentration.

The annular resonator may further comprise at least one bump stop, for example a bump stop arranged radially outward of the annular member. Bump stops are known to help limit the in-plane movement of the annular member in a vibrating structure angular rate sensor and provide a maximum stress limit.

The present disclosure extends to a vibrating structure angular rate sensor comprising an annular resonator according to any of the examples described above. The sensor may be a capacitive type angular rate sensor, an inductive type angular rate sensor or a piezoelectric type sensor. As is well known in vibrating structure angular rate sensors, the annular resonator may be arranged to resonate in the Cos 2θ mode in use.

In examples comprising a fixed support, this may be octagonally shaped, an example of which is described in more detail in EP 2799814 (the contents of which are hereby incorporated by reference).

Features of any example described herein may, wherever appropriate, be applied to any other example described herein. Where reference is made to different examples or sets of examples, it should be understood that these are not necessarily distinct but may overlap.

BRIEF DESCRIPTION OF THE DRAWINGS

Some examples of the present disclosure will now be described with reference to the accompanying drawings, in which.

DETAILED DESCRIPTION

Figure 1:
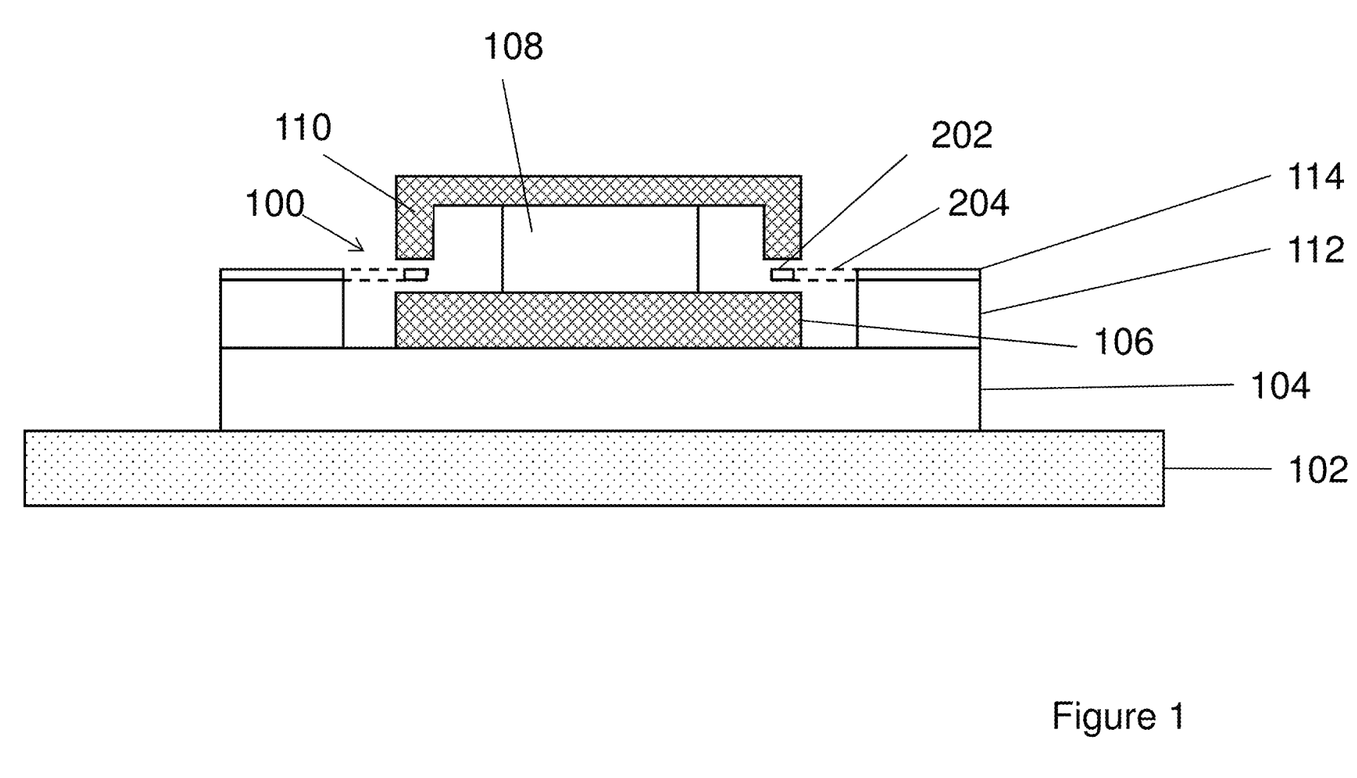
FIG. 1 is a schematic cross sectional view of an inductive type vibrating structure angular rate sensor.

FIG. 1 is a schematic cross sectional view of an inductive type vibrating structure angular rate sensor according to one example which comprises a base 102, on which sits a stack of components including a support glass layer 104, a lower pole 106, a magnet 108 and an upper pole 110. A pedestal 112 sits upon the support glass layer 104, peripheral to the lower pole 106, and supports a silicon die 114, which comprises an annular resonator 100. The annular resonator 100 comprises a planar annular member (or "ring") 202 flexibly supported by a plurality of supporting structures (or "legs") 204 formed in the silicon die 114. The annular resonator 100 is arranged so that it lies between the upper pole 110 and lower pole 106 and, as will be explained in more detail below, is arranged to vibrate during use such that a determination of the rate of rotation of the rate sensor can be made.

The magnet 108 creates a vertical magnetic field in the region of the annular resonator 100, and an oscillating current is applied tangentially along metal tracks carried by the annular resonator 100, causing it to oscillate radially in the primary Cos 2θ mode. WO 2010/007406, the contents of which are hereby incorporated by reference, provides further details about how metal tracks are typically provided over an insulating surface oxide layer on an upper surface of the ring member 202 and along its supporting legs 204, each metal track associated with a single drive or pick-off transducer. While FIG. 1 illustrates an inductive type vibrating structure angular rate sensor, a capacitive version is possible wherein there is no magnet assembly and instead there are provided radial capacitive electrodes. An example of such a capacitive type vibrating structure angular rate sensor is described in U.S. Pat. No. 6,282,958, the contents of which are hereby incorporated by reference.

Figure 2:
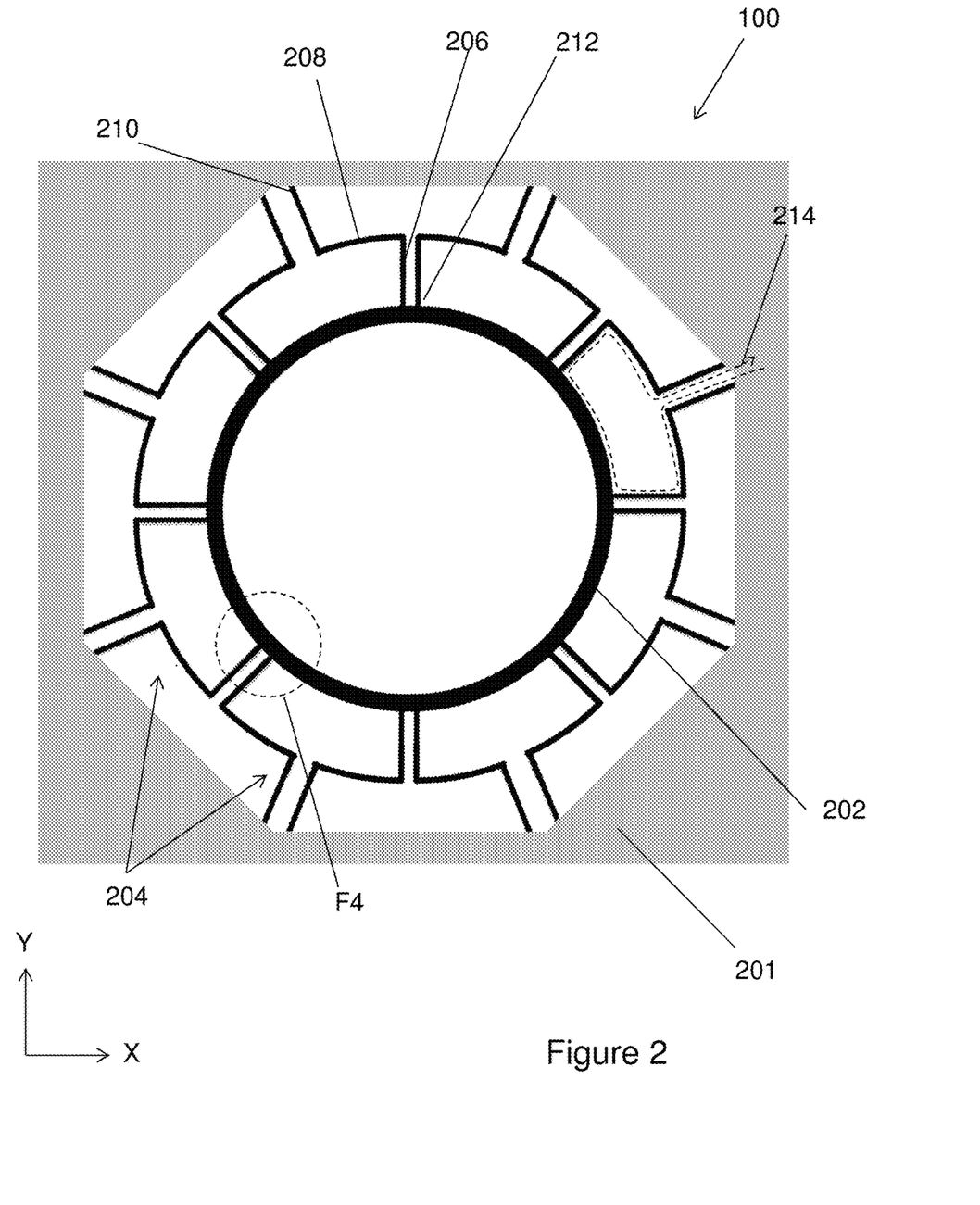
FIG. 2 is a top view of an annular resonator according to an example of the present disclosure.

FIG. 2 shows a more detailed view of the annular resonator 100 of the rate sensor. The annular resonator 100 comprises a planar annular member 202 which has an outer diameter and an in-plane thickness e.g. 120 microns. The annular member 202 lies in an X-Y plane e.g. as defined by the silicon die 114 seen in FIG. 1. The annular resonator 100 further comprises a plurality of supporting structures (or "legs") 204, which are positioned around and are connected to the outer diameter of the annular member 202 and lie in the X-Y plane defined by the annular member 202. The supporting structures 204 flexibly support the annular member 202 relative to the rest of the silicon die, which forms a fixed support 201. It can be seen that in this example the fixed support 201 takes the form of an octagon.

Each supporting structure 204 comprises an inner radial portion 206, a circumferential portion 208 and an outer radial portion 210. The inner radial portion 206 extends radially outwards from a connection 212 on the outer diameter of the annular member 202. An outermost end of the inner radial portion 206 defines a first end of the circumferential portion 208. The circumferential portion 208 extends circumferentially (i.e. maintaining a substantially constant distance from the outer diameter) to a second end which defines an inner end of the outer radial portion 210. The outer radial portion 210 extends radially outwards from its inner end to an outer end. In this example of an annular resonator for an inductive type sensor, the supporting structures 204 extend radially outwardly from the annular member 204 to the fixed support 201. However, it will be appreciated that, in other examples, one or more of the supporting structures 204 may instead, or additionally, extend radially inwardly to a fixed support located interior to the annular member 204, e.g. a central boss, for example in a capacitive type sensor.

In this example, half of the plurality of supporting structures 204 are "clockwise" structures, in that the circumferential portion 208 extends in a clockwise direction from the first end to the second end. The other half of the plurality of supporting structures 204 are "anti-clockwise" structures, in that the circumferential portion 208 extends in an anti-clockwise direction from the first end to the second end. The plurality of supporting structures 204 are arranged in pairs such that clockwise and anticlockwise-type supporting structures 204 alternate around the annular member 202. The annular resonator 100 comprises a total of sixteen supporting structures 204 (i.e. eight clockwise-anticlockwise pairs). These eight pairs prevent twisting of the annular resonator, due to current flowing along the tracking in the magnetic field, in an inductive type sensor. Of course any suitable number of supporting structures 204 may be arranged around the periphery of the annular member 202, spaced evenly or unevenly around its circumference.

The inner and outer radial portions 206, 210 of each supporting structure 204 are manufactured to have a greater thickness than the thickness of the circumferential portions 208. For example, the inner and outer radial portions 206, 210 may have a thickness of 25-40 microns while the circumferential portions 208 may have a thickness of about 20 microns. The thickness is measured in the X-Y plane of the annular member 202 e.g. as defined by the silicon die 114 seen in FIG. 1. These thicknesses may be defined by etching techniques during manufacture of the annular member 202 and/or post-manufacturing techniques, e.g. using deep reactive ion etching (DRIE). The greater thickness of the inner and outer radial portions 206, 210 provides the annular resonator 100 with greater resilience to translational shocks, which it may encounter during use. However, as will be seen below, all of the variations in thickness and shape of the support structures 204 must be carefully designed to avoid impacting the resonant frequency of the annular resonator 100 in certain resonant modes.

The connection 212 between each supporting structure 204 and the annular member 202 is also designed to maximise the stress resistance of the annular resonator 100. For example, fillets may be added at the roots of the supporting structures 204 where they form the connections 212 with the annular member 202. The other end of the supporting structures 204 may also comprise fillets where they form connections with the fixed support 201. A more detailed description of these connections 212 is given later, with reference to FIG. 4.

During manufacture, conductive (e.g. metallic) material is selectively applied to the surface of the annular member 202 and the supporting structures 204, such that several electrically conductive loops are formed. The conductive material is insulated from the conductive silicon of the annular member 202 by means of a thin oxide layer which is roughly 1 μm thick to ensure that each loop is electrically separate. An example of the tracking path of an electrically conductive loop 214 is illustrated by the dotted line in FIG. 2. Several such loops 214 are formed all around the annular member 202 and are connected to a controllable alternating current (AC) source (not shown) during use, as is well known in the art.

In use, the annular resonator 100 may be disposed within a rate sensor as shown in FIG. 1, such that the annular member 202 is positioned within a magnetic field between the two poles 106, 110 of the magnet 108. Alternating current is selectively applied to diametrically opposite conductive loops 214 (primary drive tracks) at the Cos 2θ resonant frequency, and the resulting Lorentz forces deform the annular member 202, causing the annular resonator 100 to resonate in a Cos 2θ mode, with a resonant frequency determined by the frequency of the applied alternating current and physical parameters such as the thickness of the annular member 202 and thicknesses of the supporting structures 204. The steady state primary Cos 2θ mode of resonance is diagrammatically represented in FIG. 3a.

Figure 3A:
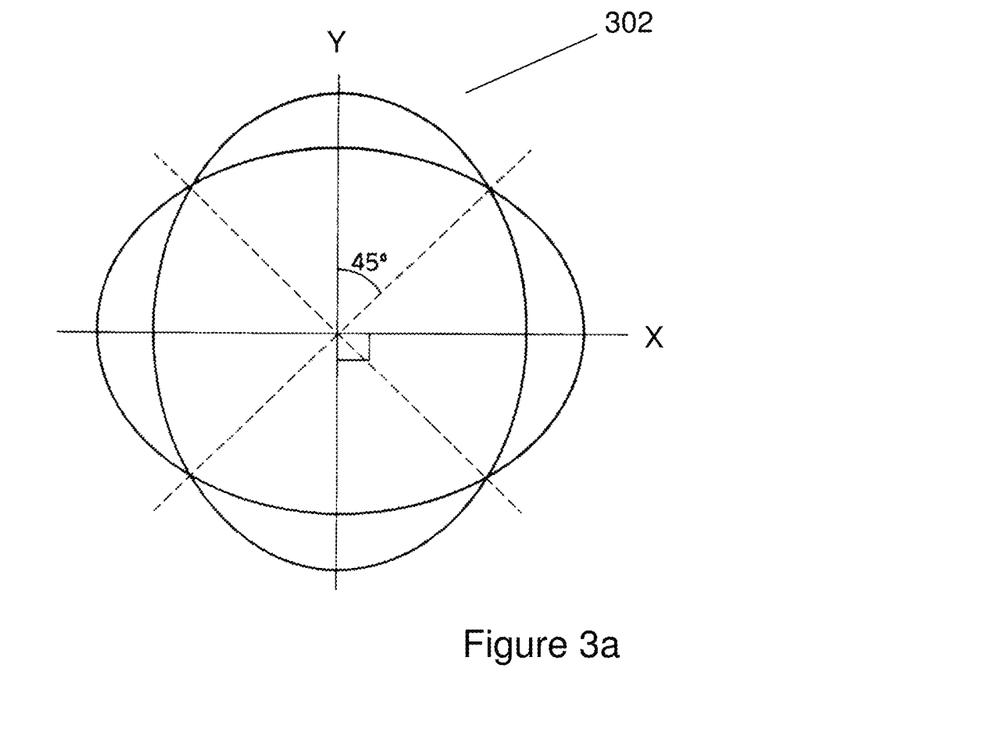
FIGS. 3a and 3b show diagrammatically primary (3a) and secondary (3b) Cos 20 vibration modes in an annular resonator.

FIG. 3a shows diagrammatically the primary Cos 2θ vibration mode in an annular resonator 302. The annular resonator 302 is ordinarily (when un-excited) circular. When excited in the primary Cos 2θ mode, however, the annular resonator 302 deforms, or more specifically, it oscillates between an ellipse with its major axis aligned along the x-axis, and an ellipse with its major axis lying along the y-axis. This in-plane resonance is seen in FIG. 3a.

Figure 3B:
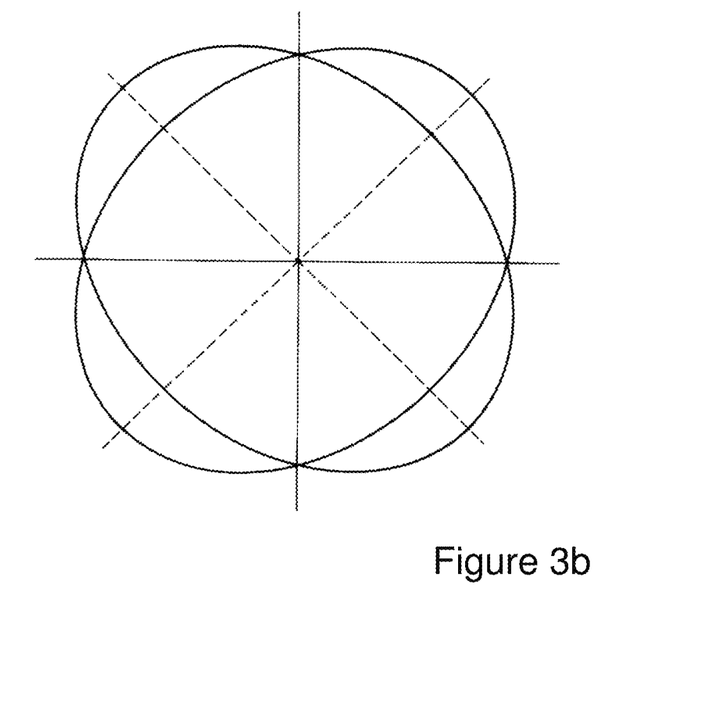

When the angular rate sensor undergoes a rotation, the nature of the deformations caused by the Lorentz forces change due to effect of the Coriolis force, and this change in deformation can be measured to provide an indication of the rate of rotation that the sensor is experiencing. The change in deformation is diagrammatically represented in FIG. 3b, which illustrates a secondary vibration mode at 45 degrees to the primary mode, with an amplitude of motion proportional to the angular rate. In the primary and secondary Cos 2θ modes of vibration the annular resonator does not experience any shear forces.

In an "open loop" type system, this amplitude of motion is measured to provide an indication of the angular rate experienced by the sensor, however in a "closed loop" type system a secondary drive is applied to null the secondary motion. In this case, measuring the secondary drive amplitude provides an indication of the angular rate as the secondary drive amplitude is proportional to the angular rate.

In the annular resonator 100, the supporting structures 204 are designed to isolate the in-plane vibrations of the annular member 202 from the rest of the structure. The thinner the supporting structures 204, the more isolated the annular member 202. The thinness of the circumferential portions 208 provides this isolation.

The number of supporting structures 204 is chosen to ensure that the Cos 2θ mode is balanced (i.e., the primary and secondary modes have the same frequency). Eight pairs of supporting structures (as described herein) satisfies this criteria however it is known that four pairs, for example, is not suitable. The annular resonator may include any suitable number of supporting structures. Some examples of annular resonators with different numbers of legs can be found in U.S. Pat. Nos. 6,883,374, 6,848,305 and 6,978,674.

The Applicant has recognised that, during translational shocks, the annular resonator 100 may also be excited in a translational mode with shear forces acting on the radial leg portions 206, 210—due to in-plane lateral deflection of the annular member 202. However, the increased thickness of the radial portions 206, 210 of the supporting structures 204 increases the resonant frequency of the annular member 202 in this translational mode, such that any excitations are reduced. As mentioned above, the radial portions 206, 210 of the supporting structures 204 with increased thickness also add stress resistance, so that the annular resonator 100 can withstand greater translational shocks without failure due to high stresses at the connections of the supporting structures 204 (to the annular member 202 and to the fixed support 201). Only thickening the radial portions 206, 210 of the supporting structures 204 means that the frequency of oscillation in the Cos 2θ mode is unaffected.

Although not pictured, the annular resonator 100 may further comprise one or more bump stops on the fixed support 201 which prevent the annular member 202 from moving in the translational mode by more than a predetermined amount in any direction. Such bump stops may be suitably spaced from the outer diameter of the annular member 202 and/or circumferential portions 208.

Figure 4:
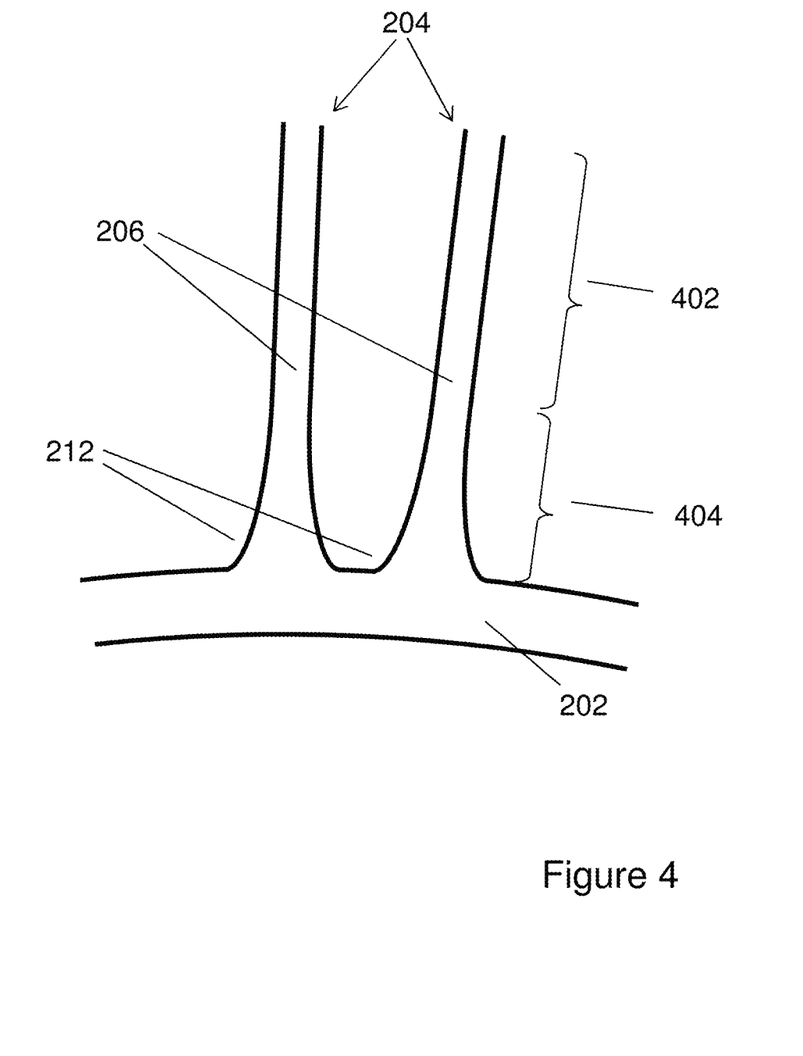
FIG. 4 shows some of the connections between an annular member and its supporting structures in an annular resonator according to an example of the present disclosure.

FIG. 4 schematically shows a top view of the connections 212 between the inner radial portions 206 of a pair of supporting structures 204 and the annular member 202, in the area highlighted by dashed circle F4 in FIG. 2. The inner radial portion 206 comprises a main section 402 with a main in-plane width, and an end section 404 that tapers outwards towards a connection 212 with the annular member 202, such that the in-plane width of the end section 404 at the connection 212 is greater than the main in-plane width of the main section 402. The flared taper of the end section 404 comprises an elliptical fillet.

The elliptical fillet of the end section 404 increases the contact surface area between the supporting structure 204 and the annular member 202, which increases the robustness of the connection 212, while not adding significantly to the weight or stiffness of the supporting structure 204, which may affect the operation of the annular resonator 100. The connections between the supporting structures 204 and the fixed support 201 may also comprise an elliptical fillet as described here.

The example of FIG. 1 relates to an inductive type gyroscope or angular rate sensor. However it will be appreciated that the annular resonator 100 may equally find use in a capacitive or piezoelectric gyroscope. The distance of the bump stops from the outer diameter of the annular member 202 may be adjusted depending on the type of gyroscope and typical range of movement of the annular member 202.

Example

An annular resonator according to an example of the present disclosure, robust SGH03, was modelled. The modelled annular resonator had dimensions of: 22 μm for the thickness of the circumferential portions of sixteen supporting structures; 27 μm for the thickness of the radial portions of the supporting structures; and 120 μm for the thickness of the annular member.

The performance of the modelled annular resonator was compared with three resonators typical of the prior art, having dimensions of: SGH01-50 μm for the thickness of the supporting structures (legs) and 120 μm for the thickness of the ring; SGH02-20 μm for the thickness of the supporting structures (legs) and 120 μm for the thickness of the ring; SGH03-20 μm for the thickness of the supporting structures (legs) and 120 μm for the thickness of the ring.

Figure 5A:
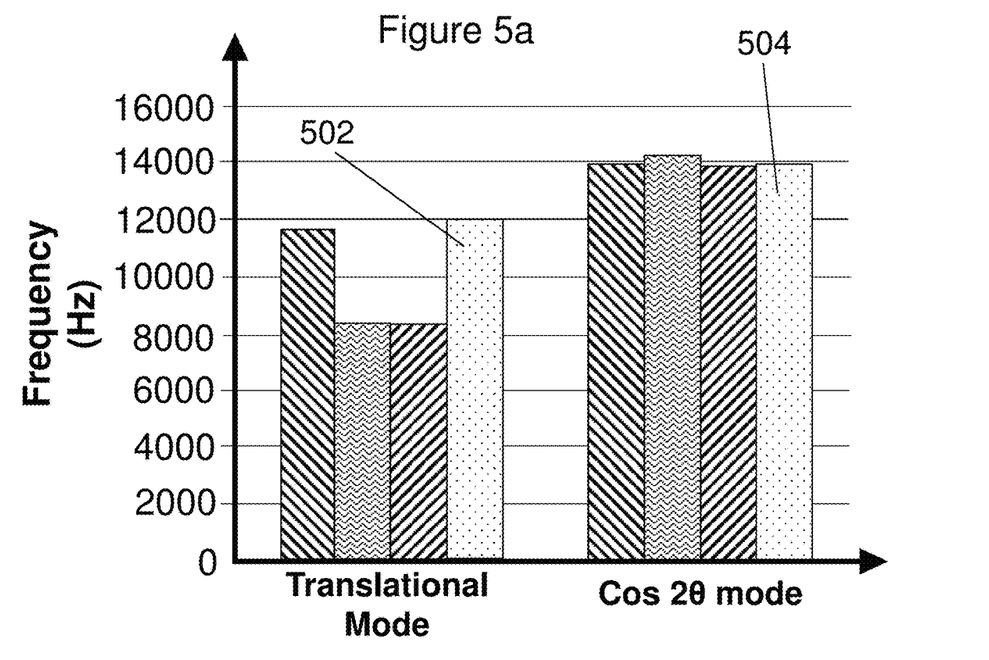
FIGS. 5a and 5b show the performance of a vibrating structure angular rate sensor modelled according to an example of the present disclosure.

FIG. 5a illustrates the resonant mode frequencies of the modelled annular resonator. This graph shows the resonant mode frequency of three resonators typical of the prior art along with that of the resonator according to the present example, in both the Cos 2θ mode and the translational mode.

The resonant frequency 502 of the robust SGH03 resonator according to the present example in the translational mode is seen to be roughly 12 kHz, which is higher than the translational resonant frequency of the other resonators tested, indicating that the stiffness of the resonator in this mode is higher than in the other resonators (typically the resonant frequency is proportional to the square root of the stiffness). SGH01 has a similar (slightly lower) translational resonant frequency, and is known to be robust but has reduced performance (lower Q factor) compared to the other resonators tested.

The resonant frequency 504 of the resonator according to the present example in the Cos 2θ mode is seen to be equal to that of the prior art resonators, at roughly 14 kHz. This demonstrates that the differential thickness of the supporting structures and the improved connections do not impact the resonant frequency in the Cos 2θ mode.

The fact that the translational mode and Cos 2θ mode resonant frequencies do not overlap means that there will be minimal inadvertent excitation of the (unwanted) translational mode when the resonator is vibrating in the Cos 2θ mode.

Figure 5B:
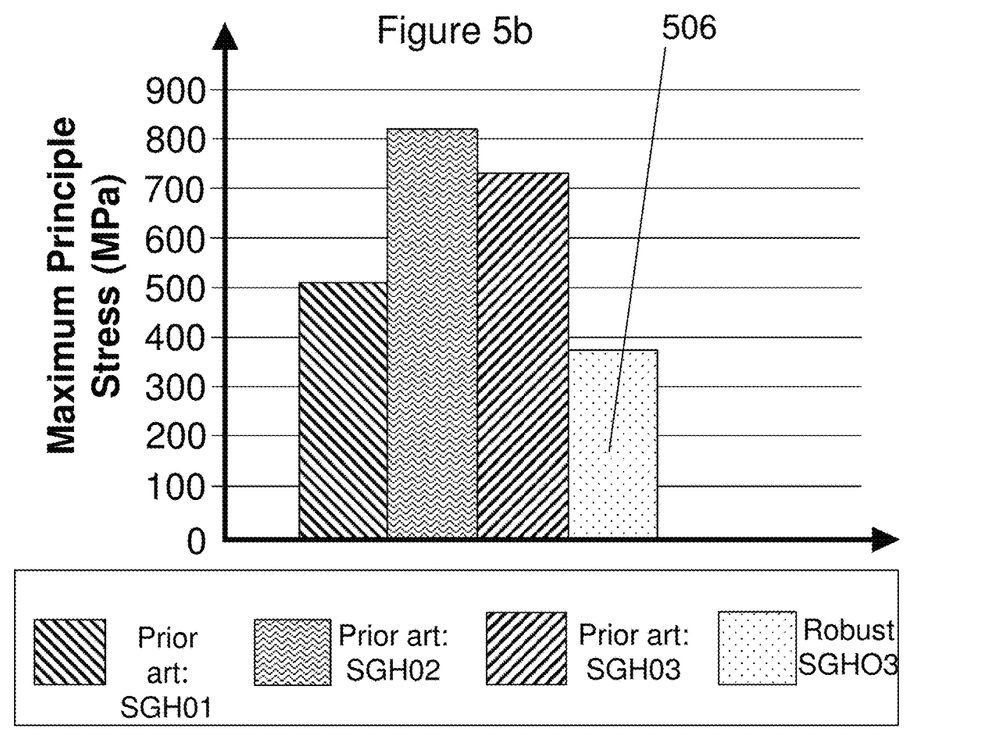

FIG. 5b illustrates the maximum stress value measured when the resonators underwent a 20000 g force in the shear direction (i.e. in the plane of the resonator). It is clear that the stress 506 experienced by the robust SGH03 resonator according to the present example is greatly reduced compared to resonators typical of the prior art.

The reduction in stress experienced indicates that the resonator is more robust and can withstand greater shocks than resonators typical of the prior art, while keeping the Cos 2θ mode at the same resonant frequency of 14 kHz. A more robust, high performance (high Q factor) sensor is thereby achieved.

The invention claimed is:

1. An annular resonator for a vibrating structure angular rate sensor, the annular resonator comprising:
   a planar annular member that lies in the X-Y plane; and
   one or more supporting structures arranged to flexibly support the annular member in the X-Y plane;
   wherein the one or more supporting structures each comprise:
   a radial portion, extending radially from the annular member in a radial direction and having a first thickness in the X-Y plane, the second thickness being defined in a direction perpendicular to the circumferential direction; and
   a circumferential portion, extending circumferentially from the radial portion in a circumferential direction and having a second thickness in the X-Y plane, the second thickness being defined in a direction perpendicular to the circumferential direction, wherein the first thickness is greater than the second thickness.

2. An annular resonator according to claim 1, wherein the one or more supporting structures each comprise a further radial portion which extends radially from the circumferential portion.

3. An annular resonator according to claim 2, wherein the further radial portion extends radially in the same direction as the radial portion.

4. An annular resonator according to claim 1 comprising an even number of supporting structures arranged in pairs around the circumference of the annular member.

5. An annular resonator according to claim 4, wherein each pair of supporting structures comprises a clockwise supporting structure and an anticlockwise supporting structure.

6. An annular resonator according to claim 4, comprising eight pairs of supporting structures.

7. An annular resonator according to claim 1, wherein the supporting structures, or pairs of supporting structures, are spaced equiangularly around the annular member.

8. An annular resonator according to claim 1, wherein the first thickness is at least 20% greater than the second thickness.

9. An annular resonator according to claim 8, wherein the first thickness is at least 40% greater than the second thickness.

10. An annular resonator according to claim 8, wherein the first thickness is at least 50% greater than the second thickness.

11. An annular resonator according to claim 1, wherein the radial portion is connected to the annular member by a connection, and wherein the supporting structure tapers from a higher width at the connection to a lower width away from the connection.

12. An annular resonator according to claim 11, wherein the connection comprises an elliptical fillet.

13. An annular resonator according to claim 1, wherein the one or more supporting structures are connected to a fixed support by a connection, and wherein the supporting structure tapers from a higher width at the connection to a lower width away from the connection.

14. A vibrating structure angular rate sensor comprising:
   an annular resonator comprising:
   a planar annular member that lies in the X-Y plane; and
   one or more supporting structures arranged to flexibly support the annular member in the X-Y plane;
   wherein the one or more supporting structures each comprise:
   a radial portion, extending radially from the annular member in a radial direction and having a first thickness in the X-Y plane, the first thickness being defined in a direction perpendicular to the radial direction; and
   a circumferential portion, extending circumferentially from the radial portion in a circumferential direction and having a second thickness in the X-Y plane, the second thickness being defined in a direction perpendicular to the circumferential direction, wherein the first thickness is greater than the second thickness.

15. A vibrating structure angular rate sensor according to claim 14, wherein the sensor is a capacitive type angular rate sensor.

16. A vibrating structure angular rate sensor according to claim 14, wherein the sensor is an inductive type angular rate sensor.

17. A vibrating structure angular rate sensor according to claim 14, wherein the annular resonator is arranged to resonate in the Cos 2θ mode.

* * * * *